US00RE38835E

(19) United States
(12) Reissued Patent
Sevilleja et al.

(10) Patent Number: US RE38,835 E
(45) Date of Reissued Patent: Oct. 18, 2005

(54) REMOTE BRAKE RELEASE MECHANISM FOR AN ELEVATOR MACHINE

(75) Inventors: Jose Sevilleja, Madrid (ES); José M. Sandoval, Madrid (ES)

(73) Assignee: Otis Elevator Company, Farmington, CT (US)

(21) Appl. No.: 10/068,605

(22) Filed: Feb. 6, 2002

Related U.S. Patent Documents

Reissue of:
(64) Patent No.: 6,021,872
Issued: Feb. 8, 2000
Appl. No.: 08/864,415
Filed: May 28, 1997

(51) Int. Cl.[7] ..... B66B 5/00
(52) U.S. Cl. ..... 187/350; 187/266
(58) Field of Search ..... 187/350, 263, 187/266, 250, 351, 359; 188/188, 189

(56) References Cited

U.S. PATENT DOCUMENTS 2,941,625 A * 6/1960 Souza ..... 187/306
4,284,175 A * 8/1981 Ishii et al. ..... 187/289
5,201,821 A * 4/1993 Ericson et al. ..... 254/375
5,492,200 A * 2/1996 Korhonen ..... 187/350
5,680,911 A * 10/1997 Wang ..... 187/263
5,890,565 A * 4/1999 Wang ..... 187/263
5,971,109 A * 10/1999 Aulanko et al. ..... 187/263

FOREIGN PATENT DOCUMENTS

| | | | |
|---|---|---|---|
| DE | 1281649 | * | 10/1968 |
| DE | 29604779 U1 | * | 7/1996 |
| DE | 29615921 | * | 2/1997 |
| EP | 0662444 A2 | * | 7/1995 |
| JP | 1-236188 | | 9/1989 |
| JP | 2-33080 | | 2/1990 |

* cited by examiner

*Primary Examiner*—Kenneth W. Noland

(57) ABSTRACT

A brake release mechanism for an elevator machine includes apparatus to reduce the braking force on the machine shaft. The apparatus may be actuated from a position located remotely from the machine.

45 Claims, 2 Drawing Sheets

REMOTE BRAKE RELEASE MECHANISM FOR AN ELEVATOR MACHINE

Matter enclosed in heavy brackets [ ] appears in the original patent but forms no part of this reissue specification; matter printed in italics indicates the additions made by reissue.

TECHNICAL FIELD

The present invention relates to elevator systems, and more particularly to brake mechanisms for elevator machines.

BACKGROUND OF THE INVENTION

A traditional elevator system for mid-rise and high-rise buildings includes a car and a counterweight interconnected by a rope and a traction machine engaged with the rope to drive the car and counterweight. The traction machine includes a sheave engaged with the rope, an electric motor for rotating the sheave, and a brake to hold the sheave when the car is stopped. The traction machine, along with an electronic controller for the elevator system and electronic drive for the machine, are housed in a machine-room located above the hoistway.

Various configurations have been suggested to eliminate the machine-room in an effort to save on the associated construction costs. One suggested elevator system uses a linear induction motor driven elevator; another uses a traction machine having a disc type motor mounted in the hoistway; and still another uses a self-propelled cab having a pinch-roller type drive engaged with the guide rails of the car.

While possibly saving construction costs of the building, an area of concern arises with such machine-roomless elevators in the event of an elevator shut-down. In a conventional elevator system having a machine-room, a mechanic may enter the machine-room and manually operate the traction machine to move the car to the nearest landing. Once there, the doors may be opened and the passengers evacuated. Due to the elimination of the machine-room in some of the suggested configurations, however, the traction machine may not be readily accessible. If a shut-down occurs, a mechanic may not be able to manually operate the traction machine.

The above art notwithstanding, scientists and engineers under the direction of Applicants' Assignee are working to develop simple and effective methods and apparatus to permit manual operation of elevator machines that are difficult to access due to their location.

DISCLOSURE OF THE INVENTION

According to the present invention, a brake release mechanism for an elevator system includes means to reduce the braking force on the machine shaft from a position located remotely from the machine.

The advantage of the invention is that in the event of a loss of power, which will cause the machine brake to engage the machine shaft, a mechanic may use the means to reduce the braking force to permit limited and controlled movement of the machine shaft, and thereby limited and controlled movement of the elevator car. The movement of the elevator car can be used to move the elevator car to a landing and permit evacuation of the elevator car. In addition, since the means is located remotely from the elevator machine, there is no need to get direct access to the machine and therefore the machine may be located in a difficult to access location, such as the overhead space in a hoistway.

In a particular embodiment, the means to reduce braking force includes a release lever disposed proximate to the brake lever and a rope engaged with the release lever and extending to a remote location relative to the elevator machine. Tensile force on the rope urges the release lever to move the brake lever against the bias of the brake lever and thereby remove the braking force on the shaft. This particular embodiment provides the advantage of a simple design and one which takes advantage of the mechanical leverage of the lever mechanism.

The foregoing and other objects, features and advantages of the present invention become more apparent in light of the following detailed description of the exemplary embodiments thereof, as illustrated in the accompanying drawings.

BEST MODE FOR CARRYING OUT THE INVENTION

Figure 1:
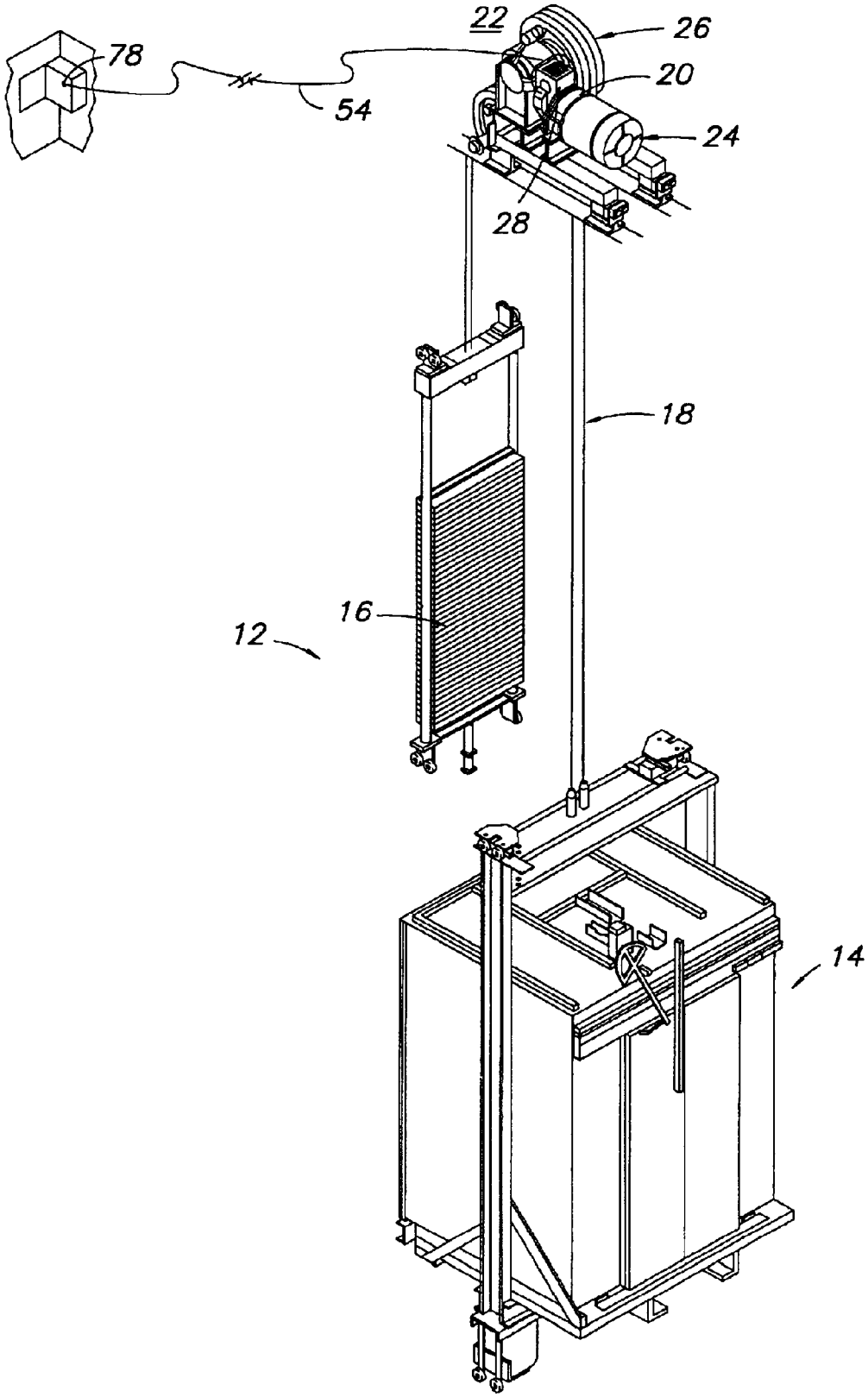
FIG. 1 is a perspective view of an elevator system.

Illustrated in FIG. 1 is an elevator system 12 having a car 14, a counterweight 16, a plurality of ropes 18 interconnecting the car 14 and counterweight 16, and a traction machine 20 disposed in the overhead space 22 of the elevator system 12. The overhead space 22 is defined as the space between the top of the car 14 and the top of the hoistway with the car 14 at its highest position. Placing the traction machine 20 in this location permits the elimination of a separate machine-room.

The traction machine 20 includes a motor 24, traction sheave 26 and a brake assembly 28. The motor 24 drives the traction sheave 26, which is engaged with the ropes 18 to move the car 14 and counterweight 16 through the hoistway. The brake assembly 28 is engaged with an output shaft 30 of the motor 24 to hold the traction sheave 26 against movement when the car 14 is stopped.

Figure 2:
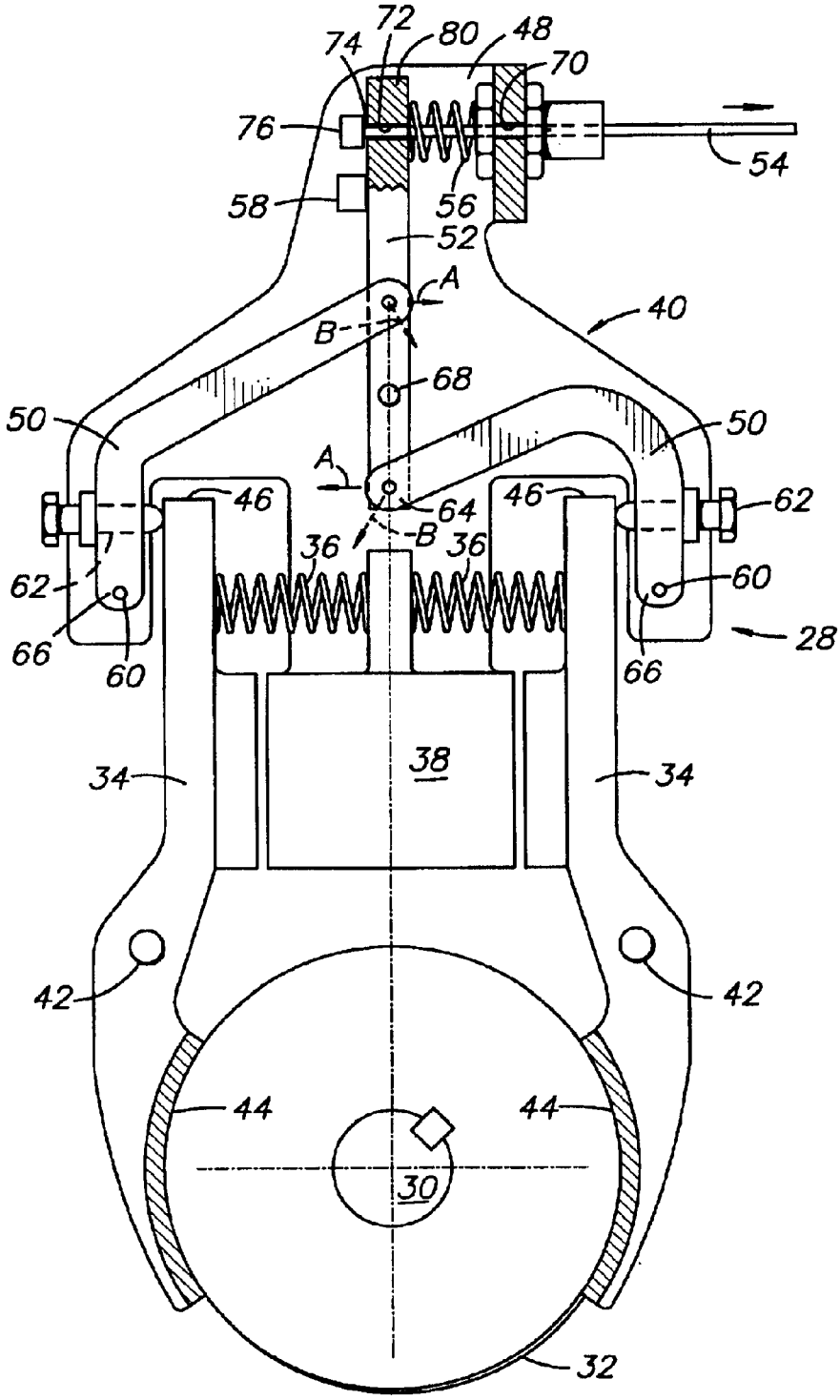
FIG. 2 is side view, partially cut-away, illustrating a brake assembly and a remote brake release mechanism.

The brake assembly 28 is illustrated in more detail in FIG. 2. The brake assembly 28 includes a brake drum 32 that is integrated with the output shaft 30 for concurrent rotation, a pair of brake levers 34, a pair of springs 36, an electromagnetic device 38, and a remote brake release mechanism 40. Each of the pair of brake levers 34 is mounted for pivoting motion about a pivot 42 and includes a brake shoe 44 disposed proximate to the brake drum 32. One end 46 of the brake lever 34 is engaged with the spring 36 to urge the brake lever 34 to pivot such that the brake shoes 44 are urged toward the brake drum 32. This end 46 of the lever 34 is also engaged with the electromagnetic device 38. If the electromagnetic device 38 is powered, the device 38 pivots the levers 34 opposite to and against the bias of the springs 36 such that the brake shoes 44 are urged away from the brake drum 32.

The remote brake release mechanism 40 includes a frame 48, a pair of release levers 50, a pivoting lever 52, a rope 54, a spring 56 and a stop 58. Each of the release levers 50 is mounted on the frame 48 for pivotal motion about a pin 60 and includes an adjustment screw 62 that extends inward from the release lever 50 and into engagement with the adjacent brake lever 34. The adjustment screw 62 is a threaded bolt that may be adjusted to permit proper engagement between the release lever 50 and the brake lever 34.

The end 64 of each release lever 50 opposite to the pinned end 66 is attached to the pivoting lever 52. The pivoting lever 52 is mounted on the frame 48 for pivotal motion about a pin 68 that is disposed between the two ends 64,66 of the release levers 50. The rope 54 passes through an aperture 70 in the frame 48, through the spring 56, and through an aperture 72 in the pivoting lever 52. The end 74 of the rope 54 adjacent to the pivoting lever 52 includes a catch 76 that is sized to prevent its passing through the aperture 72 in the pivoting lever 52. The opposite end 78 of the rope 54 is disposed in a location that is remote from the traction machine 20, such as a utility cabinet located at one of the landings for the elevator system 12. The spring 56 is disposed between the frame 48 and the pivoting lever 52 and urges the pivoting lever 52 against the stop 58.

The arrangement of the levers 50,52 is such that large movements of the end 80 of the pivoting lever 52 engaged with the rope 54 will result in very small movement of the adjustment screw 62. This effect is achieved because the distance between the pin 68 and the ends 64 of the release levers 50 is much less than the distance between the pin 68 and the end 80 of the pivoting lever 52 engaged with the rope 54. In addition, the distance between the release lever 50 pin 60 and the adjustment screw 62 is much less that the distance between the release lever 50 pin 60 and the end 64 engaged with the pivoting lever 52. This arrangement multiplies the amount of movement required of the end 80 of the pivoting lever 52 for a given amount of movement of the adjustment screw 62.

During normal operation, the electromagnetic device 38 is powered and the brake levers 34 are moved away from the brake drum 32 to permit rotation of the output shaft 30 and sheave 26. As a result, the car 14 and counterweight 16 may be driven through the hoistway by the traction machine 20. If the car 14 is brought to a stop, such as at a landing, the power is removed from the electromagnetic device 38 and the springs 36 force the brake levers 34 to pivot and the brake shoes 44 to engage the brake drum 32, thus holding the output shaft 30 and the traction sheave 26 against further movement.

In the event of a shut-down of the elevator system 12 such that there is a loss of power to the electromagnetic device 38, the springs 36 force the brake shoes 44 against the brake drum 32 and the motion of the output shaft 30, traction sheave 26, counterweight 16 and car 14 is stopped. This is a fail safe operation to prevent unwanted movement of the car 14. If the car 14 is not at a landing when it stops, however, passengers may not be easily evacuated. In this event, a mechanic may get access to the cabinet having the end 78 of the rope 54. This rope 54 is pulled to create a tension in the rope 54 sufficient to move the pivoting lever 52 away from the stop 58 and to pivot the pivoting lever 52 about the pin 68. As the pivoting lever 52 moves, it also moves the ends of the release levers 50 in the direction of the arrows A such that the release levers 50 pivot about their pinned connections 60. As the release levers 50 pivot, the adjustment screws 62 urge the brake levers 34 against the force of the springs 36 to pivot the brake levers 34 and reduce the braking force between the brake shoes 44 and the brake drum 32. The reduction in braking force permits the traction sheave 26 to rotate under the force of the unbalanced car 14 and counterweight 16. The car 14 will then either rise or descend, depending upon the weight imbalance. The rate of rise, or descent, will be slow since the brake force is not released completely. In addition, the motion caused by tension on the rope 54 is resisted by the springs 36,56 and by the release levers 50. As a result of being pinned, rigid links, the release levers 50 will resist motion other than in the direction of arrows B. The resistance to the tension in the rope 54 assists in controlling the movement of the car 14. Once the car 14 is adjacent to a landing, the tension on the rope 54 is released, the spring 56 forces the pivoting lever 52 against the stop 58 and the brake force between the brake shoes 44 and brake drum 32 is again sufficient to hold the car 14 against further movement. At this point the passengers may evacuate the car 14.

Although shown and described with respect to a drum brake, it should be noted that the invention is equally applicable to other types of brakes such as sheave brakes, disc brakes or internal drum brakes. In addition, although the invention is shown and described as using a rope to actuate the release levers, it should be apparent to one skilled in the art that this actuation may also be done using other devices, such a solenoid powered by a back-up battery power system.

Although the invention has been shown and described with respect to exemplary embodiments thereof, it should be understood by those skilled in the art that various changes, omissions, and additions may be made thereto, without departing from the spirit and scope of the invention.

What is claimed is:

1. A brake release mechanism for an elevator system, the elevator system including an elevator car traveling within a hoistway and a machine engaged with the elevator car, the machine being disposed in the hoistway and including a machine shaft, a brake having a contact surface disposed in a fixed relationship with the machine shaft for concurrent motion therewith, and a brake shoe disposed on a brake lever and proximate to the contact surface, the brake lever being biased to engage the brake shoe with the contact surface and thereby apply a braking force to the machine shaft, the brake release mechanism including means to reduce the braking force on the machine shaft to permit rotation of the shaft and thereby movement of the elevator car, wherein the means to reduce the braking force may be actuated from a position remote from the machine and outside of the hoistway.

2. The brake release mechanism according to claim 1, wherein the means to [remotely] reduce the braking force includes a rope engaged with the brake lever and extending to a remote location outside of the hoistway, wherein tensile force on the rope urges the brake lever to move against the bias of the brake lever and thereby remove the braking force on the shaft.

3. The brake release mechanism according to claim 2, further including a release lever disposed proximate to the brake lever and engaged with the rope, and wherein tensile force on the rope urges the release lever to engage the brake lever and apply a force against the bias of the brake lever and thereby remove the braking force on the shaft.

4. The brake release mechanism according to claim 3, wherein the release lever is pinned for pivotal motion about [the] *a* pin, such [pivoting] *pivotal* motion causing the brake lever to move with respect to the contact surface, and wherein tensile force on the rope urges the release lever to pivot.

5. The brake release mechanism according to claim 3, wherein the brake includes a second brake shoe disposed on a second brake lever and proximate to the contact surface, the second brake lever being biased to engage the second brake shoe with the contact surface and thereby apply braking force to the machine shaft, the brake release mechanism further including a second release lever disposed proximate to the second brake lever and engaged with the rope, and wherein tensile force on the rope urges the second release lever to engage the second brake lever and apply a force against the bias of the second brake lever and thereby remove the braking force of the second brake shoe on the shaft.

6. The brake release mechanism according to claim 5, wherein the second release lever is pinned for pivotal motion about [the] *a* pin, such [pivoting] *pivotal* motion causing the second brake lever to move with respect to the contact surface, and wherein tensile force on the rope urges the second release lever to pivot.

7. The brake release mechanism according to claim 6, further including a third pivoting lever, the third pivoting lever engaged with the rope such that tensile force on the rope causes the third pivoting lever to pivot about [its] *a* pivot point, wherein the first and second release levers are disposed in a pinned relationship with the third pivoting lever, with each release lever being engaged with the third pivoting lever on opposite sides of its pivot point, and wherein pivoting motion of the third pivoting lever causes the first and second release levers to engage the first and second brake levers.

8. The brake release mechanism according to claim 7, further including a stop that defines a resting position for the third pivoting lever, wherein tensile force on the rope urges the third pivoting lever away from the resting position.

9. The brake release mechanism according to claim 8, further including means to bias the third pivoting lever into the resting position.

10. The brake release mechanism according to claim 3, further including an adjustment screw having a contact surface, the adjustment screw extending from the release lever and towards the brake lever such that the adjustment screw contact surface is proximate to the brake lever, and the adjustment screw including means to adjust the distance between the adjustment screw contact surface and the release lever.

11. The brake release mechanism according to claim 4, further including a point of contact between the release lever and the brake lever, and a point of engagement between the release lever and the rope, and wherein [the] *a* radial distance from the pin to the point of contact is less than [the] *a* radial distance from the pin to the point of engagement.

12. A brake release mechanism for an elevator system, the elevator system including an elevator car and a machine engaged with the elevator car, the machine including a machine shaft, a brake having a contact surface disposed in a fixed relationship with the machine shaft for concurrent motion therewith, and a brake shoe disposed on each of a pair of brake levers and proximate to the contact surface, the brake levers being biased to engage the brake shoes with the contact surface and thereby apply a braking force to the machine shaft, the brake release mechanism including means to reduce the braking force on the machine shaft to permit rotation of the shaft and thereby movement of the elevator car, wherein the means to remotely reduce the braking force includes:

a rope engaged with the brake lever and extending to a remote location relative to the elevator machine, wherein tensile force on the rope urges the brake lever to move against the bias of the brake lever and thereby remove the braking force on the shaft;

first and second release levers disposed proximate to the brake levers and engaged with the rope, and wherein tensile force on the rope urges the release levers to engage the brake levers and apply a force against the bias of the brake levers and thereby remove the braking force on the shaft, wherein the second release lever is pinned for pivotal motion about the pin, such pivoting motion causing the second brake lever to move with respect to the contact surface, and wherein tensile force on the rope urges the second release lever to pivot; and a third pivoting lever, the third pivoting lever engaged with the rope such that tensile force on the rope causes the third pivoting lever to pivot about its pivot point, wherein the first and second release levers are disposed in a pinned relationship with the third pivoting lever, with each release lever being engaged with the third pivoting lever on opposite sides of its pivot point, and wherein pivoting motion of the third pivoting lever causes the first and second release levers to engage the first and second brake levers;

wherein the means to reduce the braking force may be actuated from a position remote from the machine.

13. The brake release mechanism according to claim 12, further including a stop that defines a resting position for the third pivoting lever, wherein tensile force on the rope urges the third pivoting lever away from the resting position.

14. The brake release mechanism according to claim 13, further including means to bias the third pivoting lever into the resting position.

15. A brake release mechanism for an elevator system, the elevator system including an elevator car and a machine engaged with the elevator car, the machine including a machine shaft, a brake having a contact surface disposed in a fixed relationship with the machine shaft for concurrent motion therewith, and a brake shoe disposed on a brake lever and proximate to the contact surface, the brake lever being biased to engage the brake shoe with the contact surface and thereby apply a braking force to the machine shaft, the brake release mechanism including means to reduce the braking force on the machine shaft to permit rotation of the shaft and thereby movement of the elevator car, wherein the means to remotely reduce the braking force includes a rope [engaged with the brake lever and] extending to a remote location relative to the elevator machine[, wherein tensile force on the rope urges the brake lever to move against the bias of the brake lever and thereby remove the braking force on the shaft];

a release lever disposed proximate to the brake lever and engaged with the rope, and wherein tensile force on the rope urges the release lever to engage the brake lever and apply a force against the bias of the brake lever and thereby remove the braking force on the shaft; and an adjustment screw having a contact surface, the adjustment screw extending from the release lever and towards the brake lever such that the adjustment screw contact surface is proximate to the brake lever, and the adjustment screw including means to adjust the distance between the adjustment screw contact surface and the release lever;

wherein the means to reduce the braking force may be actuated from a position remote from the machine.

16. A brake release mechanism for an elevator system, the elevator system including an elevator car and a machine engaged with the elevator car, the machine including a machine shaft, a brake having a contact surface disposed in a fixed relationship with the machine shaft for concurrent motion therewith, and a brake shoe disposed on a brake lever and proximate to the contact surface, the brake levers being biased to engage the brake shoes with the contact surface and thereby apply a braking force to the machine shaft, the brake release mechanism including means to reduce the braking force on the machine shaft to permit rotation of the shaft and thereby movement of the elevator car, wherein the means to reduce the braking force may be actuated from a position remote from the machine, wherein the means to remotely reduce the braking force includes a rope [engaged with the brake lever and] extending to a remote location relative to the elevator machine[, wherein tensile force on the rope urges the brake lever to move against the bias of the brake lever and thereby remove the braking force on the shaft]; *and* a release lever disposed proximate to the brake lever and engaged with the rope *at a point of engagement*, and wherein tensile force on the rope urges the release lever to engage the brake lever *at a point of contact* and apply a force against the bias of the brake lever and thereby remove the braking force on the shaft, wherein the release lever is pinned for pivotal motion about [the] *a* pin, such [pivoting] *pivotal* motion causing the brake lever to move with respect to the contact surface, and wherein tensile force on the rope urges the release lever to pivot;

[a point of contact between the release lever and the brake lever; and]

[a point of engagement between the release lever and the rope, and]

wherein [the] *a* radial distance from the pin to the point of contact is less than [the] *a* radial distance from the pin to the point of engagement.

17. An elevator system including:

an elevator car traveling within a hoistway;

a machine engaged with the elevator car, the machine being disposed in the hoistway and including a machine shaft, a brake having a contact surface disposed in a fixed relationship with the machine shaft for concurrent motion therewith, and a brake shoe disposed on a brake lever and proximate to the contact surface, the brake lever being biased to engage the brake shoe with the contact surface and thereby apply a braking force to the machine shaft; and a brake release mechanism including means to reduce the braking force on the machine shaft to permit rotation of the shaft and thereby movement of the elevator car, wherein the means to reduce the braking force may be actuated from a position remote from the machine and outside of the hoistway.

18. The elevator system according to claim 17, wherein the means to [remotely] reduce the braking force includes a rope engaged with the brake lever and extending to a remote location outside of the hoistway, wherein tensile force on the rope urges the brake lever to move against the bias of the brake lever and thereby remove the braking force on the shaft.

19. The elevator system according to claim 18, wherein the brake release mechanism further includes a release lever disposed proximate to the brake lever and engaged with the rope, and wherein tensile force on the rope urges the release lever to engage the brake lever and apply a force against the bias of the brake lever and thereby remove the braking force on the shaft.

20. The elevator system according to claim 19, wherein the release lever is pinned for pivotal motion about [the] *a* pin, such [pivoting] *pivotal* motion causing the brake lever to move with respect to the contact surface, and wherein tensile force on the rope urges the release lever to pivot.

21. The brake release mechanism according to claim 19, wherein the brake includes a second brake shoe disposed on a second brake lever and proximate to the contact surface, the second brake lever being biased to engage the second brake shoe with the contact surface and thereby apply braking force to the machine shaft, the brake release mechanism further including a second release lever disposed proximate to the second brake lever and engaged with the rope, and wherein tensile force on the rope urges the second release lever to engage the second brake lever and apply a force against the bias of the second brake lever and thereby remove the braking force of the second brake shoe on the shaft.

22. The elevator system according to claim 21, wherein the second release lever is pinned for pivotal motion about [the] *a* pin, such [pivoting] *pivotal* motion causing the second brake lever to move with respect to the contact surface, and wherein tensile force on the rope urges the second release lever to pivot.

23. The elevator system according to claim 22, wherein the brake release mechanism further includes a third pivoting lever, the third pivoting lever engaged with the rope such that tensile force on the rope causes the third pivoting lever to pivot about [its] *a* pivot point, wherein the first and second release levers are disposed in a pinned relationship with the third pivoting lever, with each release lever being engaged with the third pivoting lever on opposite sides of its pivot point, and wherein pivoting motion of the third pivoting lever causes the first and second release levers to engage the first and second brake levers.

24. The elevator system according to claim 23, wherein the brake release mechanism further includes a stop that defines a resting position for the third pivoting lever, wherein tensile force on the rope urges the third pivoting lever away from the resting position.

25. The elevator system according to claim 24, wherein the brake release mechanism further includes means to bias the third pivoting lever into the resting position.

26. The elevator system according to claim 19, wherein the brake release mechanism further includes an adjustment screw having a contact surface, the adjustment screw extending from the release lever and towards the brake lever such that the adjustment screw contact surface is proximate to the brake lever, and the adjustment screw including means to adjust the distance between the adjustment screw contact surface and the release lever.

27. The elevator system according to claim 20, wherein the brake release mechanism further includes a point of contact between the release lever and the brake lever, and a point of engagement between the release lever and the rope, and wherein [the] *a* radial distance from the pin to the point of contact is less than [the] *a* radial distance from the pin to the point of engagement.

*28. A brake release mechanism for an elevator system, the elevator system including*

*an elevator car traveling within a hoistway and*

*a machine engaged with the elevator car, the machine being disposed higher than the car in the hoistway and including*

*a machine shaft, and*

*a brake having a contact surface disposed in a fixed relationship with the machine shaft for concurrent motion therewith, and a plurality of brake shoes disposed proximate to the contact surface, each of the brake shoes being biased independently of one another to engage with the contact surface to thereby apply a braking force to the machine shaft,*

*the brake release mechanism including*

*means to reduce the braking force applied by each of the brake shoes on the machine shaft to permit rotation of the shaft and thereby movement of the elevator car,*

*wherein the means to reduce the braking force may be actuated from a position remote from the machine and outside of the hoistway.*

*29. The brake release mechanism according to claim 28, wherein*

*the means to reduce the braking force includes a rope coupled with all of the brake shoes and extending to a remote location outside of the hoistway, wherein tensile force on the rope urges each of the brake shoes to move against the bias of the brake shoes to thereby remove the braking force on the shaft.*

*30. The brake release mechanism according to claim 29, the means to reduce the braking force further including a plurality of release levers each disposed proximate to one of the brake shoes and engaged with the rope, and*

*wherein tensile force on the rope urges the release levers to apply a force against the bias of the brake shoes to thereby remove the braking force on the shaft.*

*31. The brake release mechanism according to claim 30, further including a pivoting lever to which the release levers are pivotally connected, the pivoting level being engaged with the rope such that tensile force on the rope causes the pivoting lever to pivot causing the release levers to apply the force against the bias of the brake shoes.*

*32. The brake release mechanism according to claim 31, further including*

*a stop that defines a resting position for the pivoting lever; and*

*means to bias the pivoting lever into the resting position,*

*wherein the tensile force on the rope urges the third pivoting lever away from the resting position.*

*33. A brake release mechanism for an elevator system, the elevator system including*

*an elevator car traveling within a hoistway and*

*a machine engaged with the elevator car, the machine being disposed higher than the elevator car in the hoistway and including*

*a machine shaft, and*

*a brake having a contact surface disposed in a fixed relationship with the machine shaft for concurrent motion therewith, and a plurality of brake shoes disposed proximate to the contact surface, each of the brake shoes being biased independently of one another to engage with the contact surface to thereby apply a braking force to the machine shaft,*

*the brake release mechanism comprising:*

*a plurality of release levers, each selectively urging one of the brake shoes away from the contact surface to reduce the braking force applied by the brake shoes; and*

*an actuator for actuating all of the release levers from a position remote from the machine and outside of the hoistway.*

*34. The brake release mechanism according to claim 33, wherein*

*the actuator includes a rope coupled with all of the release levers and extending to a remote location outside of the hoistway, wherein tensile force on the rope urges each of the release levers to urge one of the brake shoes away from the contact surface.*

*35. The brake release mechanism according to claim 34, the actuator further including a pivoting lever to which the release levers are pivotally connected, the pivoting lever being engaged with the rope such that tensile force on the rope causes the pivoting lever to pivot causing each of the release levers to urge one of the brake shoes away from the contact surface.*

*36. The brake release mechanism according to claim 35, further including*

*a stop that defines a resting position for the pivoting lever; and*

*means to bias the pivoting lever into the resting position, wherein the tensile force on the rope urges the third pivoting lever away from the resting position.*

*37. An elevator system including:*

*an elevator car traveling within a hoistway;*

*a machine engaged with the elevator car, the machine being disposed higher than the elevator car in the hoistway and including*

*a machine shaft, and*

*a brake having a contact surface disposed in a fixed relationship with the machine shaft for concurrent motion therewith, and a plurality of brake shoes disposed proximate to the contact surface, each of the brake shoes being biased independently of one another to engage with the contact surface to thereby apply a braking force to the machine shaft; and*

*a brake release mechanism including*

*means to reduce the braking force applied by each of the brake shoes on the machine shaft to permit rotation of the shaft and thereby movement of the elevator car,*

*wherein the means to reduce the braking force may be actuated from a position remote from the machine and outside of the hoistway.*

*38. The elevator system according to claim 37, wherein*

*the means to reduce the braking force includes a rope coupled with all of the brake shoes and extending to a remote location outside of the hoistway, wherein tensile force on the rope urges each of the brake shoes to move against the bias of the brake shoes to thereby remove the braking force on the shaft.*

*39. The elevator system according to claim 38, the means to reduce the braking force further including a plurality of release levers each disposed proximate to one of the brake shoes and engaged with the rope, and*

*wherein tensile force on the rope urges the release levers to apply a force against the bias of the brake shoes to thereby remove the braking force on the shaft.*

*40. The elevator system according to claim 39, the means to reduce the braking force further including a pivoting lever to which the release levers are pivotally connected, the pivoting lever being engaged with the rope such that tensile force on the rope causes the pivoting lever to pivot causing the release levers to apply the force against the bias of the brake shoes.*

*41. The elevator system according to claim 40, further including*

*a stop that defines a resting position for the pivoting lever; and*

*means to bias the pivoting lever into the resting position, wherein the tensile force on the rope urges the third pivoting lever away from the resting position.*

*42. An elevator system including:*

*an elevator car traveling within a hoistway;*

*a machine engaged with the elevator car, the machine being disposed higher than the elevator car in the hoistway and including*

*a machine shaft, and*

*a brake including a contact surface disposed in a fixed relationship with the machine shaft for concurrent motion therewith, and a plurality of brake shoes disposed proximate to the contact surface, each of the brake shoes being biased independently of one another to engage with the contact surface to thereby apply a braking force to the machine shaft; and*

*a brake release mechanism including:*

*a plurality of release levers, each selectively urging one of the brake shoes away from the contact surface to reduce the braking force applied by the brake shoes, and*

*an actuator for actuating all of the release levers from a position remote from the machine and outside of the hoistway.*

*43. The elevator system according to claim 42, wherein*

*the actuator includes a rope coupled with all of the release levers and extending to a remote location outside of the hoistway, wherein tensile force on the rope urges each of the release levers to urge one of the brake shoes away from the contact surface.*

*44. The elevator system according to claim 43, the actuator further including a pivoting lever to which the release levers are pivotally connected, the pivoting lever being engaged with the rope such that tensile force on the rope causes the pivoting lever to pivot causing each of the release levers to urge one of the brake shoes away from the contact surface.*

*45. The brake release mechanism according to claim 44, further including*

*a stop that defines a resting position for the pivoting lever; and*

*means to bias the pivoting lever into the resting position, wherein the tensile force on the rope urges the third pivoting lever away from the resting position.*

* * * * *